(No Model.)
L. LAMBORN.
ROAD MENDER.
No. 277,748. Patented May 15, 1883.
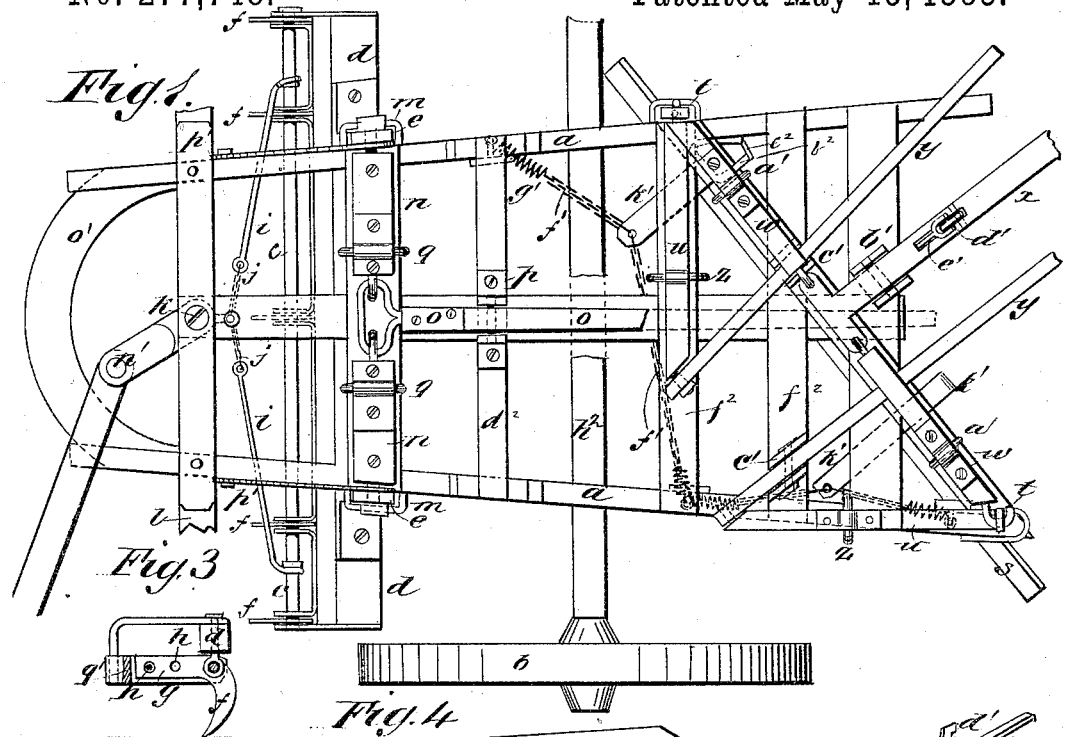
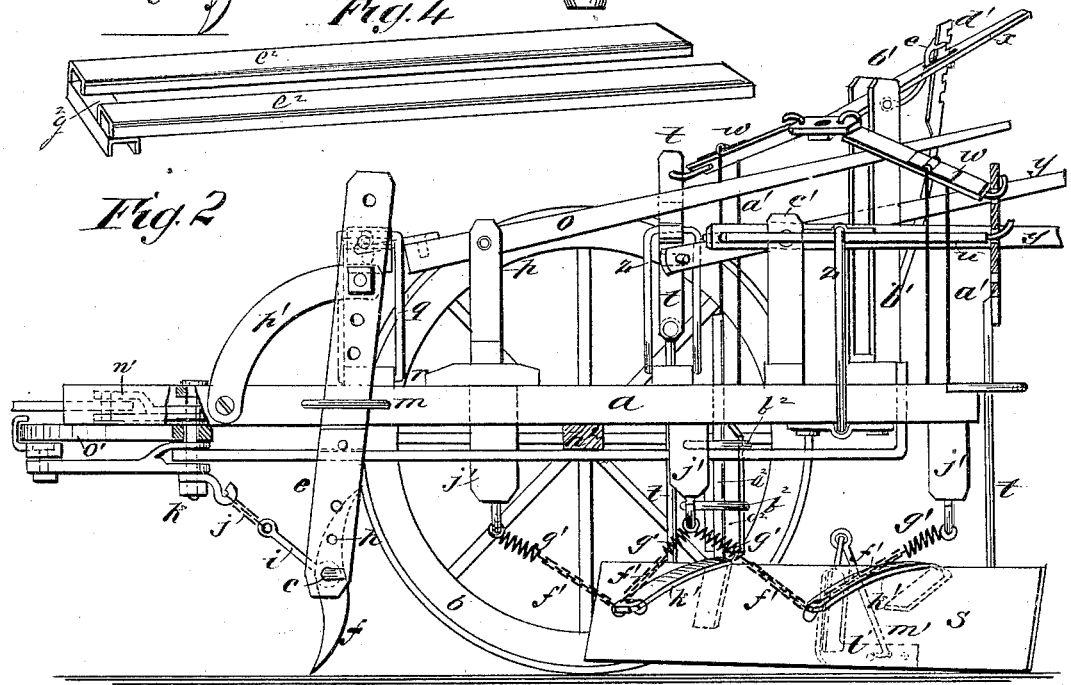
WITNESSES:
Francis McArdle
C. Sedgwick
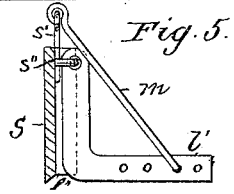
INVENTOR:
L. Lamborn
BY Munn & Co
ATTORNEYS.

UNITED STATES PATENT OFFICE.

LEWIS LAMBORN, OF HAMORTON, PENNSYLVANIA.

ROAD-MENDER.

SPECIFICATION forming part of Letters Patent No. 277,748, dated May 15, 1883.

Application filed July 24, 1882. (No model.)

*To all whom it may concern:*

Be it known that I, LEWIS LAMBORN, of Hamorton, in the county of Chester and State of Pennsylvania, have invented a new and Improved Road-Mender, of which the following is a full, clear, and exact description.

The invention has for its object to construct a road-mender on wheels, and to so combine and arrange its various parts that it will first scratch the surface, and then dispose the loose earth to give the desired shape to the road.

Reference is to be had to the accompanying drawings, forming part of this specification, in which similar letters of reference indicate corresponding parts in all the figures.

Figure 1 is a plan view of my improved road-mending machine. Fig. 2 is a side elevation, with a part in section. Fig. 3 is a detail of the arrangement of the pulverizing-teeth. Fig. 4 is a perspective view of devices which I propose to employ in a modified form of the machine. Fig. 5 is a vertical section of the scraper, with a side elevation of the blade or rudder.

On a suitable bed-frame, $a$, to be mounted on wheels $b$ in any suitable way, I suspend a transverse rod, $c$, near the front end of the frame by a cross-beam, $d$, attached to vertically-sliding bars $e$, as in Fig. 1; or the rod $c$ may be mounted directly in said bars $e$, as in Fig. 2, or in any equivalent thereof, on which rod $c$ I arrange teeth $f$, either double-pointed, as in Fig. 2, or single-pointed, as in Fig. 3, and having an arm, $g$, in one case, but to be secured in both forms by wooden pins $h$, to be broken and relieve the teeth when obstructed by stones or other objects too strong for the teeth to overcome. The rod $c$, so mounted, is coupled by rods $i$ and chains $j$, either or both, with the bed-frame or draft-bar in any approved way for applying the draft, the said connection being preferably made near the outer ends of said rod or bar, and to the pivot-bolt $k$. It will also be coupled at the ends with the frame by rods or chains for resisting lateral divergence of the teeth.

The bars $e$ are mounted on the frame $a$ in guides $m$, which may be of any approved form or arrangement, so that said bars may shift up and down to vary the depth of the teeth in the ground, and at the upper ends they are connected by levers $n$ with the hand-lever $o$ for working them, the arrangement being so that downward pressure on the lever $o$ will force the teeth into the ground, and a rising motion of said lever will lift the teeth out of the ground. The lever $o$ is pivoted in the standard $p$, and the levers $n$ are pivoted on the supports $q$, which are pivoted in their supports $r$, to allow them to swing in unison with the swing of the short arm of the lever $o$.

The scraper $s$ is to be suspended near the rear end of the bed-frame, under the rear axle, (for the purpose of showing its arrangement more clearly it is shown in the drawings somewhat in the rear of its proper location,) and diagonally across it, by rods $t$, connected to levers $u$, and also to levers $w$, the latter connecting with the lever $x$, by which the scraper may be raised and lowered evenly from end to end, and the former connecting with independent levers $y$, by which the scraper may be raised and lowered at either end alone. When the two levers $y$ are employed, lever $x$ may be dispensed with. Levers $u$ have their fulcrums on vibrating supports $z$, and levers $w$ having similar supports, $a'$. All the levers range backward along the frame, to be worked by an operator to be stationed in a suitable place thereat, the scraper, like the teeth, being forced into the ground by downward pressure on the levers and raised by lifting them up. The fulcrum of lever $x$ is in the post $b'$, and the fulcrum of levers $y$ in posts $c'$. A notched holding-pawl, $d'$, with a spring-keeper, $e'$, is arranged with levers $x$, to hold the scraper in the working position, and the other levers may be similarly provided, if desired.

The draft is applied to the scraper by the chains $f'$ and springs $g'$, suitably attached to hangers $j'$ and connected to bars $k'$, which pass over to and down the back of the scraper for connecting near the lower edge, in order to so apply the stress as to relieve the rods $t$, and so that the front face of the scraper will be unobstructed in the discharge of the earth along it. The connecting-points of hangers $j'$ and bars $k'$ should be in a straight line with the bottom of the scraper. The chains $f'$ and springs $g'$, instead of being connected directly with the hangers $j'$, may connect, if so desired, with a rod connecting the bottoms of said hangers, and extending along the same parallel with the scraper, said rod and hangers being properly stayed to the frame.

The springs are employed in the draft-gear for relieving the horses, and also the scraper, of the severe shocks they would be exposed to by the contact of the scraper with the solid stones and other objects.

To the hind part of the scraper, or to any other approved device attached to the frame, I propose to connect a rudder-blade, $l'$, for running edgewise in the earth, to resist the tendency of the scraper to cause the machine to diverge from the straight course, the said rudder being adjustable or not, and provided with a brace, $m'$, for staying it laterally, said brace to be adjustable in case the rudder is. The eyebolts $s'$ $s''$ connect the eyes of brace $m'$ and rudder $l'$ with the back of scraper $s$. $l''$ is a projection from the scraper-back, against which the rudder bears, as shown in Fig. 5 of the drawings.

I propose to attach the front axle or bolster, $l$, to a link, $n'$, pivoted to the bolt $k$, and being clipped or not to a curved bar, $o'$, attached to the front end of the frame, for a guide to enable the draft-pole to swing from side to side, as the direction of the pull of the team varies, to guide the machine and for turning short when used in narrow roadways. The bar $n'$ may be permanently attached to curved bar $o'$, and the latter may be fitted to slide. The bar $e$, by which the teeth are suspended, is stayed with braces $p'$, and they are made adjustable vertically on said braces, and also on the levers $n$, to be shifted high or low, as may be desired.

When the armed teeth of Fig. 3 are used, suitable forwardly or rearwardly projecting brackets, $q'$, will be attached to the bar $d$, for the support of the break-pins $h$. The bar may be removable to substitute the form of teeth represented in Fig. 2, if desired.

I propose to joint the suspending-rods $t$ in case of need, and in that case have one or more rods, $a^2$, rigidly attached to the scraper, and extending up through guide staples or rings $b^2$, attached to supporting-bars $c^2$, dependent from the frame.

I also propose in some cases to dispense with the teeth, and in such cases will only extend the frame to the bar $d^2$ in front of the axle $h^2$, using one or two bars, $e^2$, for connecting the bolt $k$ for hitching to the machine, said bars being attached to the cross-bars $d^2$ and $f^2$, and the bolt $k$ fitted in the cross-bar $g^2$, for connecting with the axle $l$.

Having thus described my invention, what I claim as new, and desire to secure by Letters Patent, is—

1. The combination, with the tooth-rod $c$ and bars $e$, of the pivoted frame-braces $p'$ and keepers $m$, said bars $e$ being provided with holes near their top, and a clamp-nut and screw, whereby said bars may be held firmly, but so as to allow the bars to turn or be raised relatively to the upper ends of said braces, as described.

2. The combination of a series of teeth, $f$, supporting-rod $c$, vertical adjustable supports $e$, and rods $i$ or chains $j$, or both, substantially as described.

3. The combination, with the movable bars $e$, of the transverse levers $n$ $n$ and the longitudinal lever $o$, whereby said bars may be pressed down or lifted up, as described.

4. The combination, with the scraper $s$, of the rods $t$, the levers $w$ $w$ on pivoted fulcrum-rods, and the hand-lever $x$, whereby the entire scraper may be evenly raised, as described.

5. The combination, with the scraper $s$, of draft-chains $f'$ and springs $g'$, substantially as described.

6. The combination, with a scraper, $s$, suspended by rods $t$, of the bars or plates $k'$, inclined downwardly in front of the scraper, carried over it, and brought to a bearing near the middle of its back, whereby the draft-strain on the scraper will be about its middle, so as to draw it as nearly as possible in a horizontal plane.

7. The combination, with draft-connections and scraper, of springs $g'$ and hangers $j'$, holding the rear springs, as shown in Fig. 2 of the drawings, whereby the shock of obstructions will be taken yieldingly and the part affected quickly returned to its proper place.

8. As an improvement in rudders for scrapers, the bottom sharpened blade, $l'$, attached to the rear of scraper, arranged in the line of draft and braced by the rod $m'$, as shown and described.

9. The front axle or bolster, $l$, combined and connected with the draft-pole by means of the link $n'$, pivoted to both the draft-pole and the axle or bolster, as shown and described.

LEWIS LAMBORN.

Witnesses:
  W. W. LAMBORN,
  A. RUPERT.